CIRCUIT INTERRUPTER CONTACT STRUCTURE
Filed Dec. 30, 1953 9 Sheets-Sheet 1
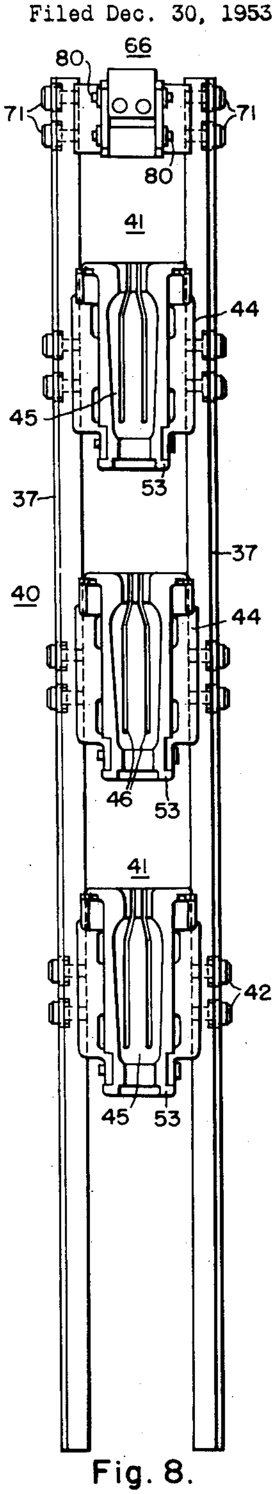
Fig. 8.
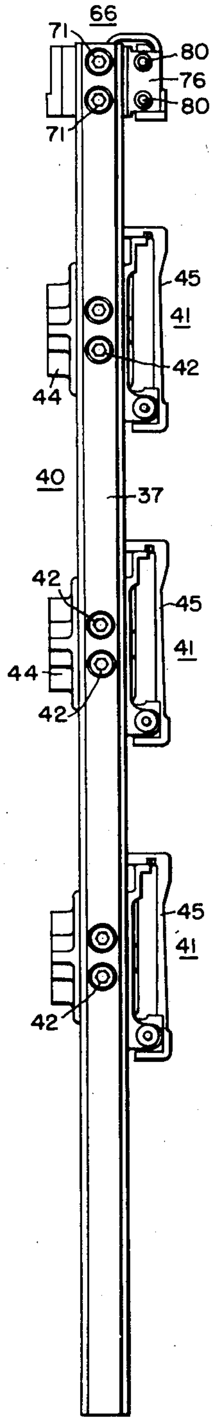
Fig. 9.
Fig. I.
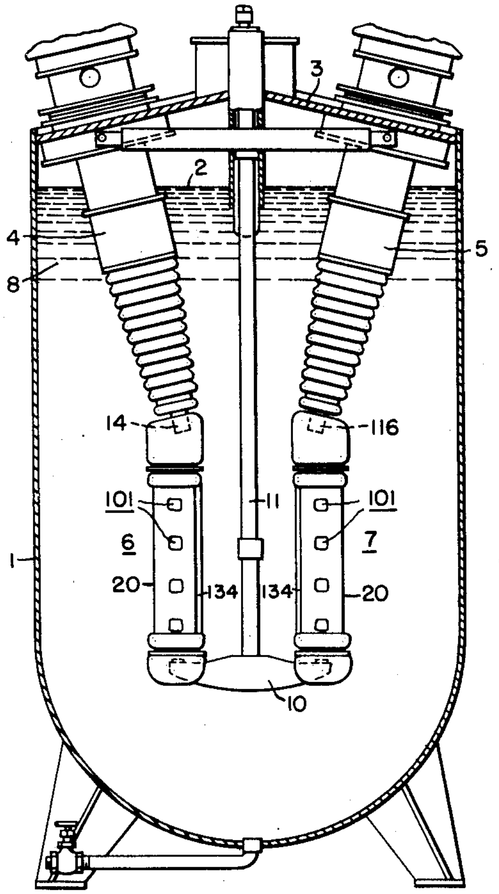
INVENTORS
Fritz E. Florschutz &
Carl G. Lentjes.
BY
Ralph H. Swingle
ATTORNEY April 30, 1957 F. E. FLORSCHUTZ ET AL 2,790,880

CIRCUIT INTERRUPTER CONTACT STRUCTURE

Filed Dec. 30, 1953 9 Sheets-Sheet 2

CIRCUIT INTERRUPTER CONTACT STRUCTURE

Filed Dec. 30, 1953 9 Sheets-Sheet 7

CIRCUIT INTERRUPTER CONTACT STRUCTURE

United States Patent Office 2,790,880

Patented Apr. 30, 1957

2,790,880

CIRCUIT INTERRUPTER CONTACT STRUCTURE

Fritz E. Florschutz and Carl G. Lentjes, Pittsburgh, Pa., assignors to Westinghouse Electric Corporation, East Pittsburgh, Pa., a corporation of Pennsylvania

Application December 30, 1953, Serial No. 401,142

14 Claims. (Cl. 200—166)

This invention relates to circuit interrupters in general, and, more particularly, to contact structures therefor.

A general object of our invention is to provide an improved contact structure for a circuit interrupter, particularly one adaptable for high-voltage and heavy-current application, but it is to be clearly understood that certain features of our invention may be applicable to circuit interrupters interrupting small amounts of power.

In order to make possible higher voltage transmission systems, it would be desirable to have a high-voltage circuit interrupter adaptable for being utilized on a 330 kv. transmission voltage system, and capable of carrying 2,000 amperes continuously. It is also desirable for such a circuit interrupter to have an interrupting rating of 25,000,000 kva., with an interrupting capacity capable of interrupting 44,000 amperes at 330 kv.

In addition, such a circuit interrupter should have a very fast interrupting time, say of the order of 3 cycles at all currents within its rating, and should preferably have a high-speed reclosing time of say, approximately 15 cycles.

It is another object of our invention to improvise an improved contact structure adaptable for use in a circuit interrupter of the above-described interrupting capacity.

It is another object of our invention to provide an improved contact structure which will enable the user of the apparatus to easily dismantle the interrupter, when required, and enable a visual inspection of the contact structure to be easily made.

More specifically, it is a purpose of our invention to provide an improved relatively stationary bridging contact assembly which may be easily moved into position within an interrupting casing and may be readily withdrawn therefrom, so that in the insertion process the relatively stationary contact assemblage may be rapidly moved to the correct position.

Still another object is to provide an improved guiding means for a relatively stationary bridging contact assemblage, which will permit the rapid guiding of said assemblage to the proper position within a circuit interrupter casing.

Yet another object of our invention is to provide an improved relatively stationary contact assemblage having an improved contact finger arrangement so that during the interruption of heavy currents, the contact structure will be pressed more strongly into contacting engagement.

Still another object of our invention is to provide an improved contact structure for a circuit interrupter, which may be of either high or low-current rating, in which improved contact pressure will be obtained.

Yet a further object is to provide an improved relatively stationary contact assemblage involving one or more intermediate bridging contact structures, in which improved contacting engagement is provided. In our invention, this is in part accomplished by slotting one end of the intermediate contact construction to obtain, in effect, a plurality of resiliently mounted fingers; whereas, the other end of the intermediate contact assemblage is unslotted to obtain thereby a proper distribution of current flow through the contact assemblage.

Yet another object is to provide an improved contact arrangement for a circuit interrupter, which will provide a long interrupting life with little attention required to service the contact structure.

Further objects and advantages will readily become apparent upon reading the following specification, taken in conjunction with the drawings; in which, Figure 1 is a side elevational view, partially in section, of a circuit interrupter embodying our invention, and shown in the closed-circuit position;

Fig. 8 is a front elevational view of the ladder-like relatively stationary bridging contact assemblage utilized in the circuit interrupter of Fig. 1;

Fig. 9 is a side elevational view of the relatively stationary bridging contact assemblage shown in Fig. 8;

Figure 2:
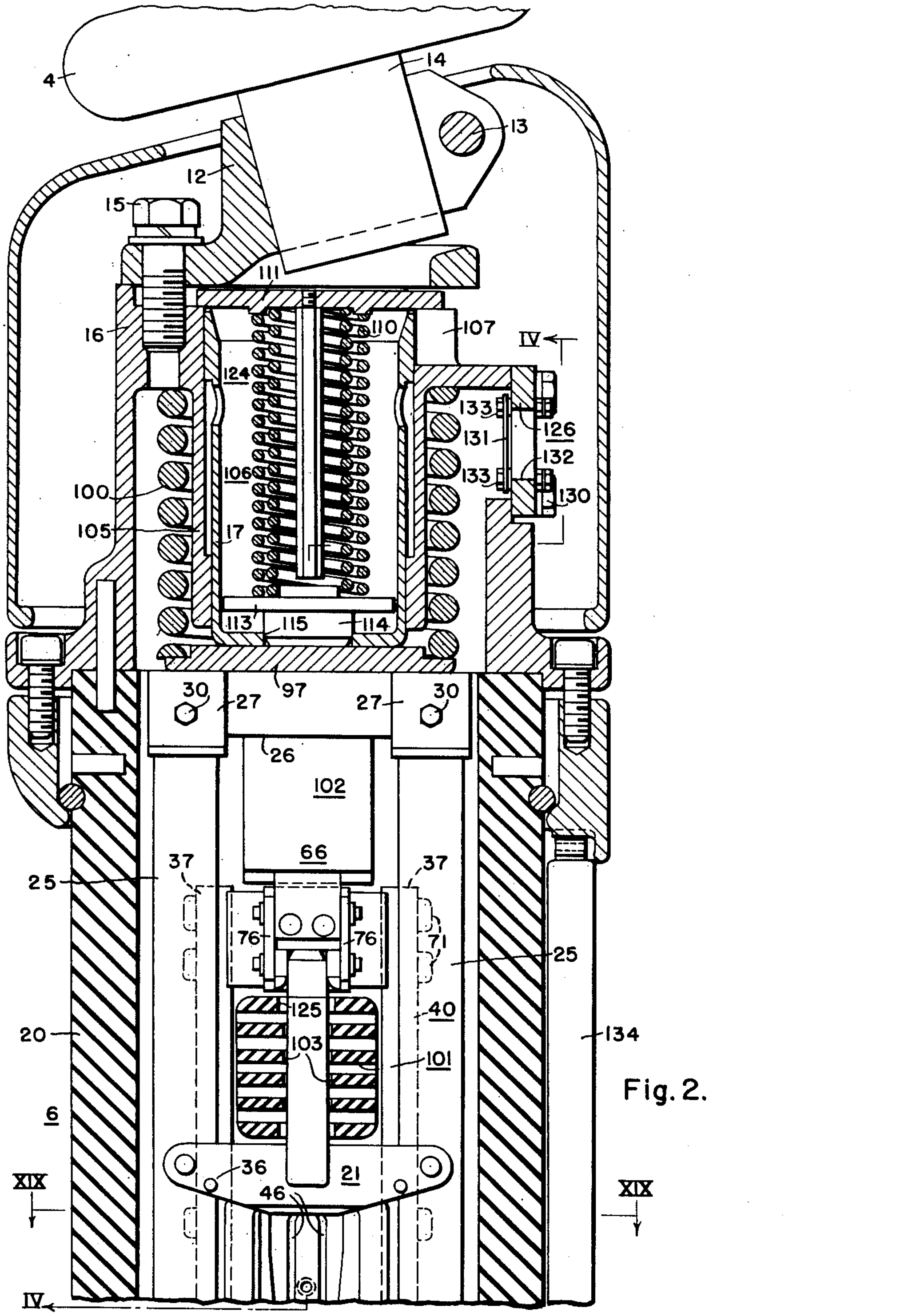
Fig. 2 is an enlarged fragmentary vertical sectional view through the upper end of the left-hand interrupting assembly of the circuit interrupter shown in Fig. 1, the contact structure being pictured in the closed-circuit position.

Referring to the drawings, and more particularly to Fig. 1 thereof, the reference numeral 1 indicates a tank filled to the level 2 with a suitable arc-extinguishing fluid 8, such as in this particular instance circuit interrupter oil. Depending from the cover 3 of the tank 1 are a pair of terminal bushings 4, 5 to the lower ends of which are supported interrupting assemblies 6, 7.

Electrically interconnecting the interrupting assemblies 6, 7 is a conducting cross-bar 10, which is vertically actuated in a reciprocal manner by an insulating operating rod 11, which may be actuated by any suitable mechanism, which forms no part of our invention.

Referring more particularly to Figs. 2–4 and 18 and 19, it will be observed that a contact foot 12 is bolted by a bolt 13 to the lower end of the terminal stud 14, which extends interiorly through the left-hand terminal bushing 4 of Fig. 1.

The contact foot 12 is secured by three triangularly-spaced mounting bolts 15 to a top cylinder-casting 16, which encloses the upper end of the interrupting assemblage 6. Movable within the top cylinder-casting 16 is a cylindrically-shaped piston 17, which provides desired oil flow within the casing 20 of the interrupting assemblage 6, as more fully described hereinafter.

Figure 5:
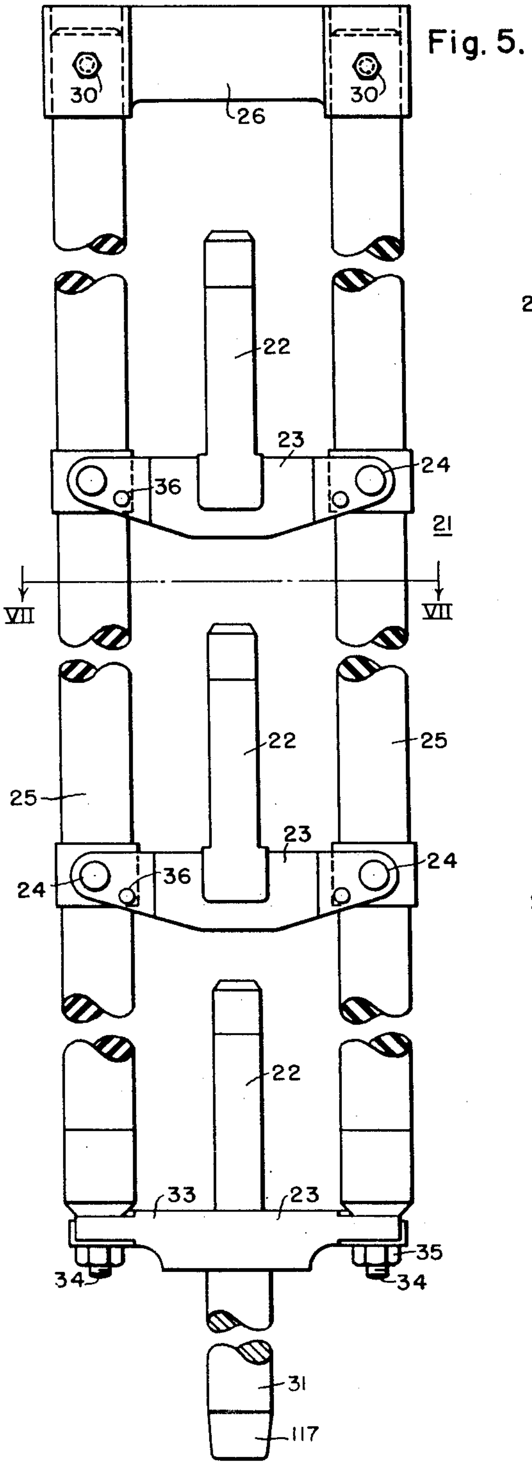
Fig. 5 is a side elevational view of the movable contact assemblage utilized in the interrupting assembly.
Figure 6:
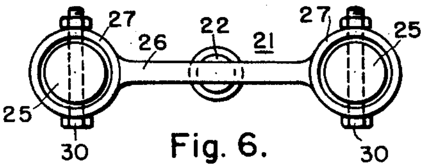
Fig. 6 is a top plan view of the movable contact assemblage shown in Fig. 5.
Figure 7:
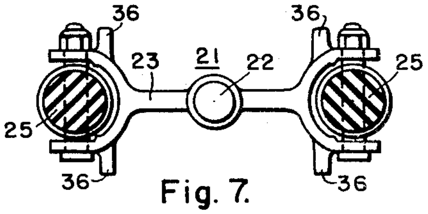
Fig. 7 is a sectional view taken along the line VII—VII of Fig. 5, looking in the direction of the arrows.

Reciprocally movable within casing 20 of the interrupting assemblage 6 is a ladder-like movable contact assemblage, generally designated by the reference numeral 21, and more clearly illustrated in Figs. 5–7 of the drawings. The movable contact assemblage 21 includes a plurality of spaced rod-shaped movable contacts 22 which are integrally formed with a plurality of bridging castings 23, the latter being clamped by bolts 24 to a pair of parallel disposed insulating operating rods 25. The upper ends of the insulating rods 25 are mechanically connected and braced by a saddle assembly 26, which comprises, in this particular instance, a metallic brace, more clearly shown in Fig. 6. The ends of the metallic brace 26 form sleeves 27, which are bolted, as at 30, to the upper ends of the insulating operating rods 25.

Figure 3:
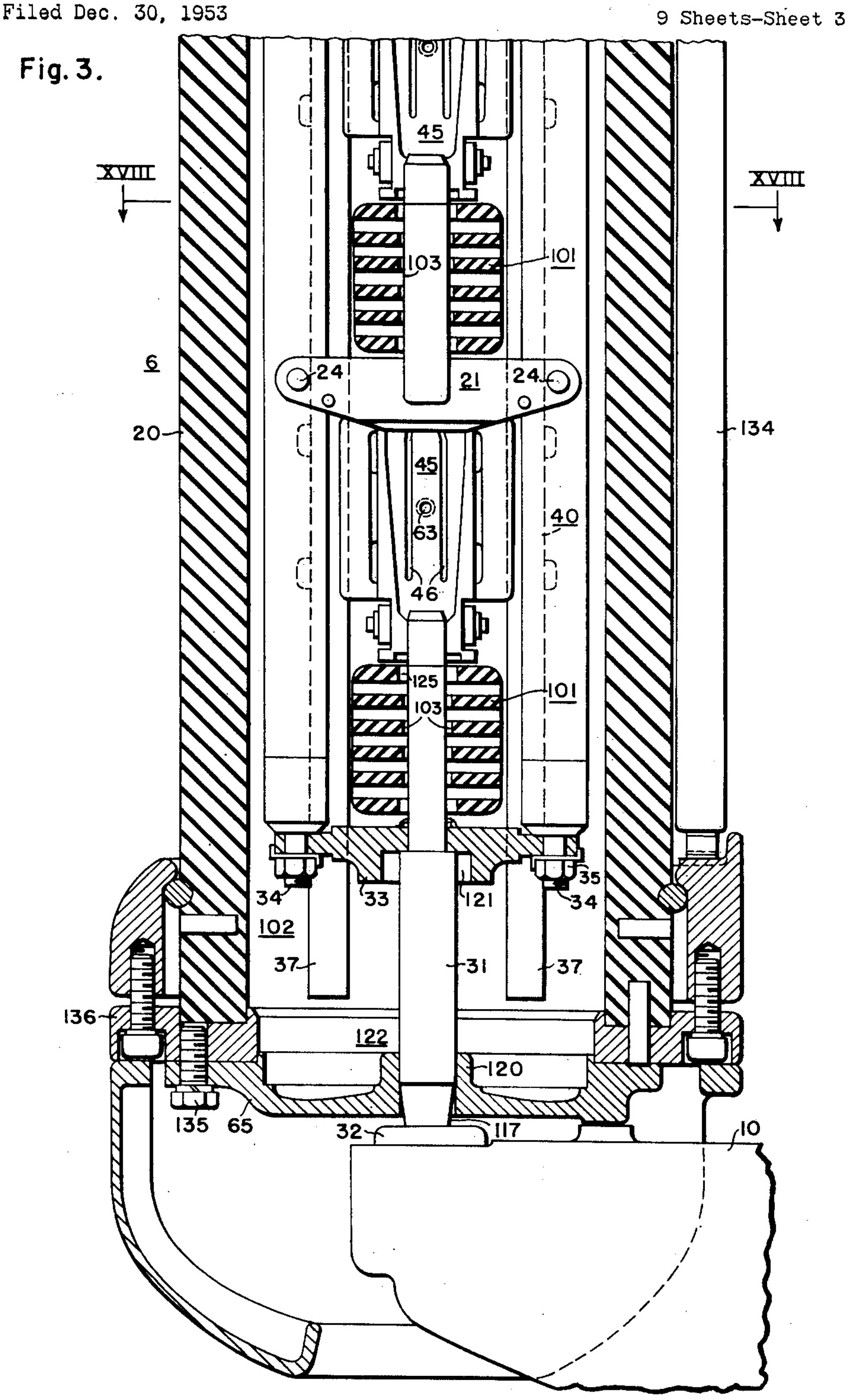
Fig. 3 is a view similar to that of Fig. 2, but showing a cross-sectional view through the lower end of the interrupting assembly, with the contact structure likewise being indicated in the closed-circuit position.

The lower movable contact 22 has a lower extension 31, which is directly engaged, in abutting manner, by a contact button 32 disposed at the end of the conducting cross-bar 10 in a manner more clearly shown in Fig. 3 of the drawings. The movable contact 22 and its extension 31 are brazed to a metallic cross-bar 33 (Fig. 5), the ends of which are apertured to receive bolts 34, which are appropriately mounted at the lower ends of the insulating operating rods 25. Nuts 35 secure the cross-bar 33 to the rods 25.

Figure 18:
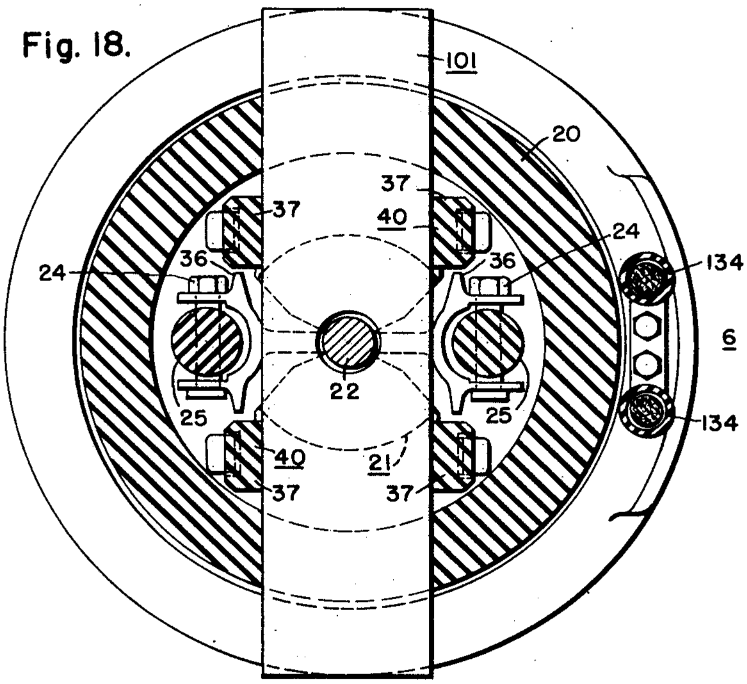
Fig. 18 is a sectional view taken through the interrupting assemblage of Fig. 3, substantially along the line XVIII—XVIII thereof; and, Fig. 19 is a sectional view taken through the interrupting assemblage of Fig. 2, substantially along the line XIX—XIX thereof.

Referring to Fig. 7, it will be observed that the bridging castings 23 have outwardly projecting lugs 36, which serve a desirable function of guiding the reciprocal movement of the ladder-like movable contact assemblage 21 within the casing 20, the lugs 36 being guided along insulating mounting bars 37, as shown in Fig. 18, the mounting bars 37 being associated with a relatively stationary bridging contact assemblage, generally designated at 40 in Figs. 8 and 9, and more fully described hereinafter.

Figure 11:
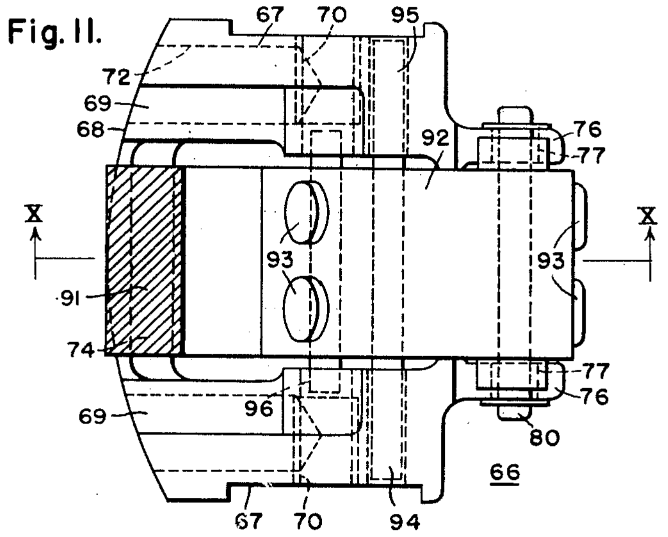
Fig. 11 is a top plan view of the contact guide support shown in Fig. 10, with the movable contact omitted.
Figure 13:
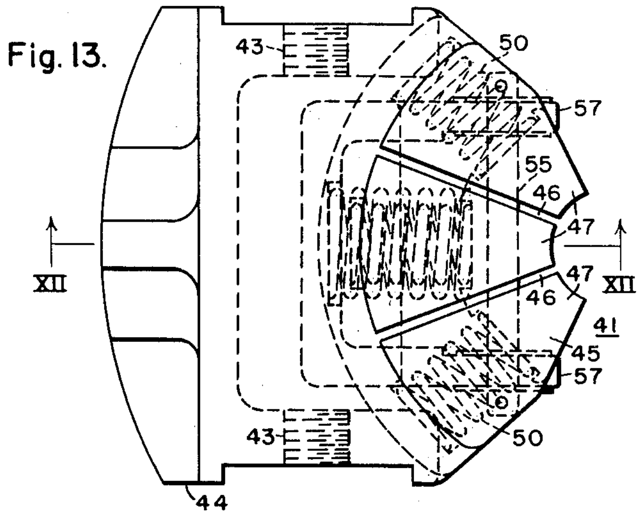
Fig. 13 is a top plan view of the intermediate bridging contact assemblage of Fig. 12.
Figure 12:
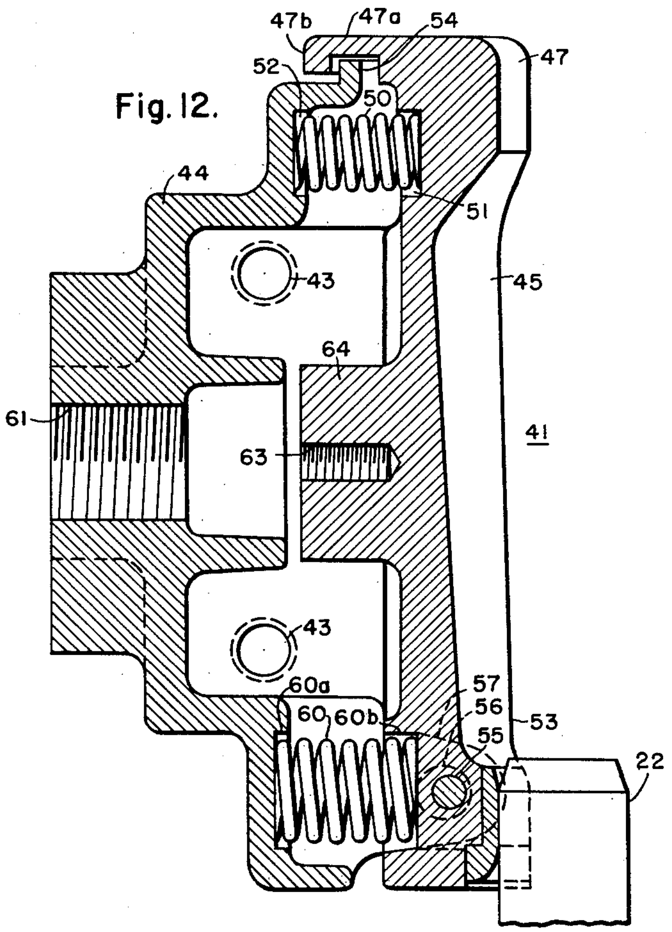
Fig. 12 is an enlarged vertical sectional view through one of the intermediate bridging contact assemblages utilized in the relatively stationary contact assemblage shown in Figs. 8 and 9, the section being taken substantially along the line XII—XII of Fig. 13.
Figure 16:
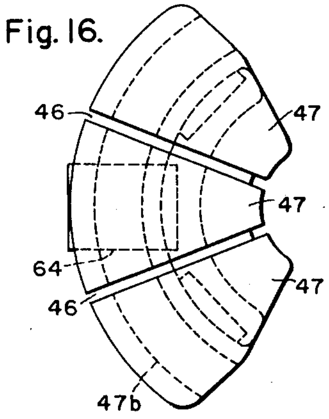
Fig. 16 is a top plan view of the intermediate bridging contact shown in Figs. 14 and 15.
Figure 17:
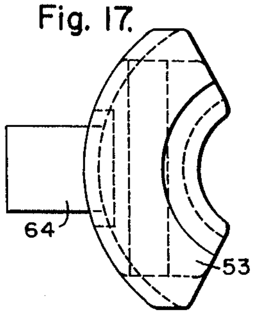
Fig. 17 is an inverted bottom plan view of the intermediate bridging finger construction of Figs. 14 and 15.
Figure 15:
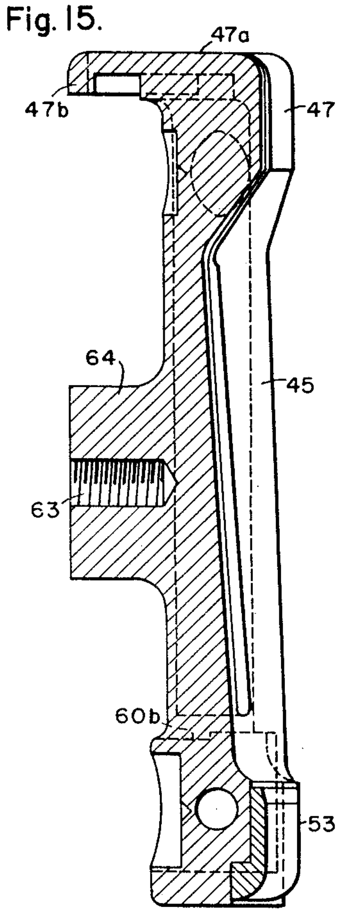
Fig. 15 is a vertical sectional view taken through the intermediate contact finger construction of Fig. 14, taken substantially along the line XV—XV thereof.

Referring to Figs. 8 and 9, and considering in connection therewith Figs. 10–14, it will be observed that the relatively stationary bridging contact assemblage 40 is of ladder-like configuration, the insulating mounting bars 37 supporting a plurality of intermediate bridging contact assemblages, generally designated by the reference numeral 41 and shown more clearly in Figs. 12 and 13 of the drawings. Mounting bolts 42 pass through the sides of the bars 37 and are threadedly secured to tapped apertures 43 provided in a bracket 44, the configuration of which may be obtained from a study of Figs. 12 and 13. Each bracket 44 resiliently supports an intermediate bridging contact finger 45, the configuration of which is more readily apparent from Figs. 14–17 of the drawings. It will be noted that the upper end of the bridging contact 45 is slotted, as at 46 in Fig. 16, so that the upper end of the bridging contact 45 may provide a plurality of resiliently mounted finger contacts 47 of segmental configuration, each of which is biased by a contact compression spring 50, more clearly apparent from a study of Figs. 12 and 13 of the drawings. One end of each contact spring 50 seats in a recess 51 in the upper end of the finger contact portion 47; whereas, the other end of the contact compression spring 50 seats in a recess 52 provided in the bracket casting 44.

Figure 19:
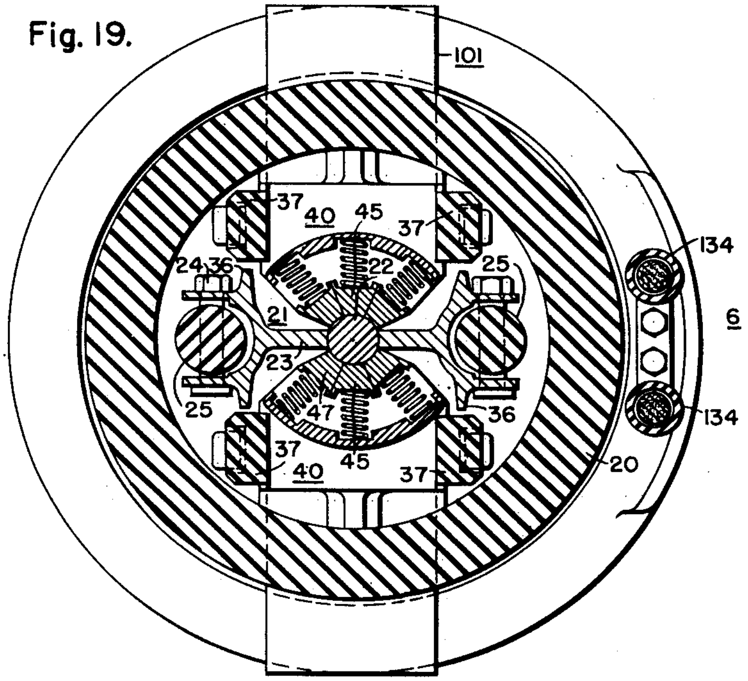

Thus, the upper end of each intermediate bridging contact 41 comprises three resiliently biased finger contact portions 47, which bear against the side of an appropriate rod-shaped movable contact 22, as more clearly illustrated in Fig. 19 of the drawings.

Figure 14:
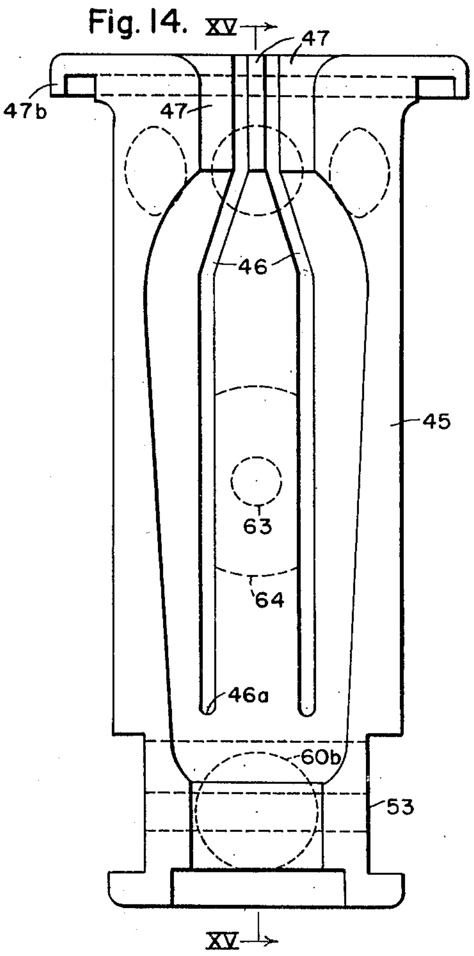
Fig. 14 is a front elevational view of one of the intermediate bridging contact finger arrangements utilized in the intermediate bridging contact assemblage of Figs. 12 and 13.

The slots 46 do not extend the entire length of the intermediate contact 45, but stop at the point 46*a*, as indicated in Fig. 14 of the drawings. As a result, the lower end of the intermediate bridging contact 45 is solid, and as later brought out, the lower end 53 of the bridging contact 45 is the end at which arcing takes place, the upper end of the bridging contact 45 constantly maintaining sliding contacting engagement with the side of the movable rod-shaped contact 22.

It will be observed that the upper end 47*a* of each finger portion 47 has a hook portion 47*b*, which cooperates with an upwardly projecting flange 54 integrally formed with the bracket casting 44, so that inward radial movement of the finger contact portions 47 is limited. The lower end 53 of each intermediate contact 41 has a pin 55 passing therethrough with relatively slight clearance. The ends of the pin 55 pass through enlarged apertures 56 provided in inwardly extending lug portions 57 integrally formed with the bracket casting 44. Consequently, there is clearance between the pin 55 and the holes 56, so that lateral movement of the lower end 53 of the bridging contact 45 is permitted, as indicated in Fig. 12 of the drawings.

Although we provide three contact compression springs 50 at the upper end of the bridging contact 41 to resiliently bias the three finger contact portions 47 inwardly, we provide only a single contact compression spring 60 at the lower end 53 of the bridging contact 41 to bias the lower solid end 53 of the intermediate contact 41 radially inwardly. The compression spring 60 seats at one end in a recess 60*a* of the bracket casting 44, and the other end of the spring 60 seats in a cavity 60*b* provided at the lower end 53 of the intermediate contact 41, and shown more clearly in Figs. 14 and 15 of the drawings.

Figure 4:
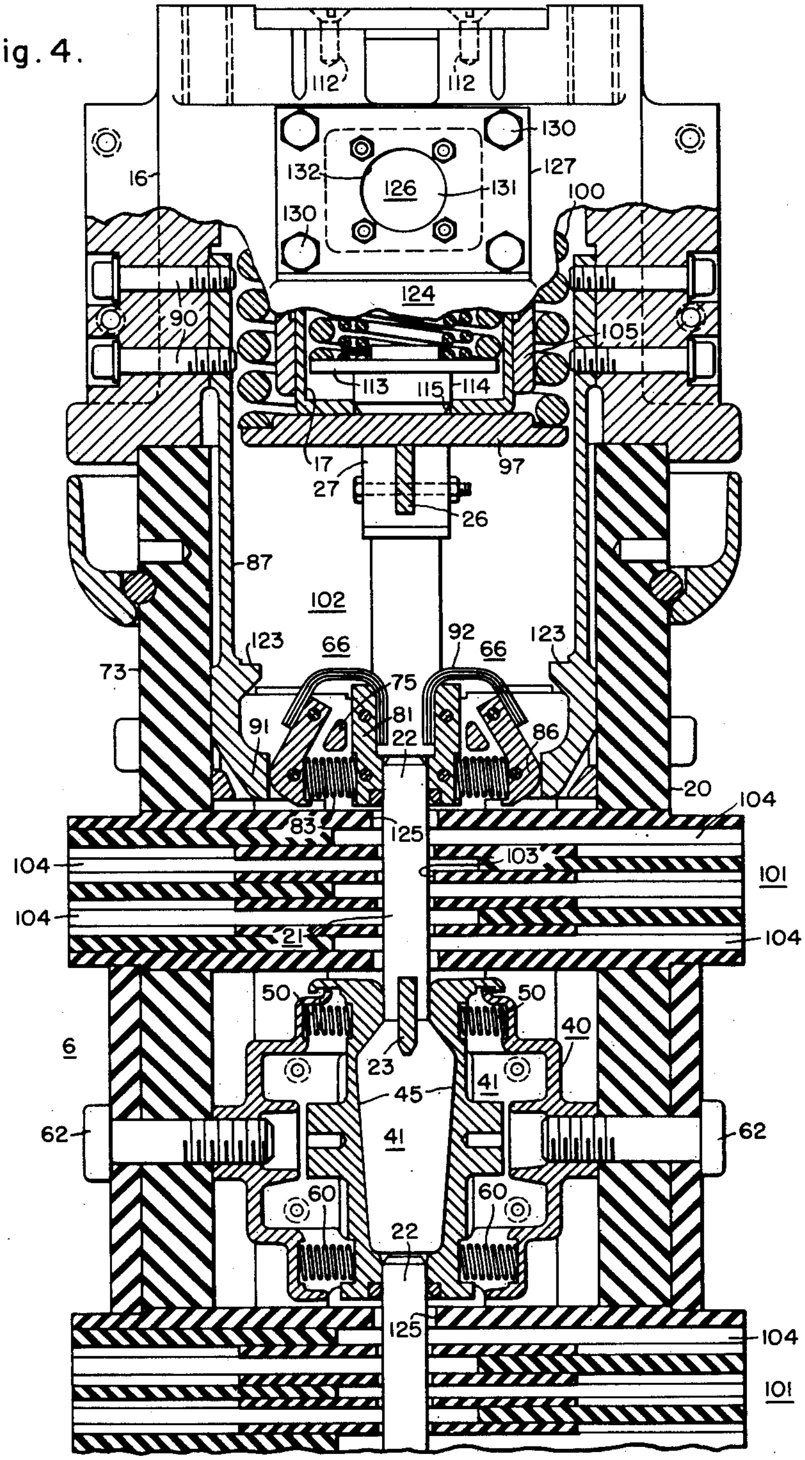
Fig. 4 is an enlarged fragmentary vertical sectional view, taken substantially along the line IV—IV of Fig. 2, with the contact structure being shown in the closed-circuit position.

It will be noted that the bracket casting 44 has a tapped aperture 61 provided therein, which accommodates mounting bolts 62 extending through the side wall of the casing 20 in a manner more clearly apparent from Fig. 4 of the drawings. A tapped aperture 63 is also provided in a boss portion 64 of the intermediate contact 41 to accommodate a retracting bolt, which may be inserted through the opening 61, upon removal of the mounting bolt 62, to effect lateral outward movement of the intermediate contact 41. This feature, together with other features relating to the interrupting assembly 6 as a whole, are set forth and claimed in patent application Serial No. 401,239, filed December 30, 1953, by Robert E. Friedrich, filed concurrently herewith, and assigned to the Westinghouse Electric Corporation.

Referring again to Figs. 8 and 9 of the drawings, it will be observed that three of the intermediate contact assemblages 41 are mounted between the bars 37 and collectively comprise the relatively stationary contact assemblage 40. Two such assemblages 40 are disposed interiorly within the casing 20 and are inserted therein through the lower end of the casing 20, with the lower casting plate 65 (Fig. 3), of course, removed. Each ladder-like relatively stationary contact assemblage 40 is mounted along the interior wall of the casing 20 by the bolts 62, as shown in Fig. 4, and the two assemblages 40, which are positioned diametrically across the casing 20, cooperate in bearing along the sides of the movable rod contacts 22 in a manner more clearly apparent from Fig. 4 of the drawings.

Figure 10:
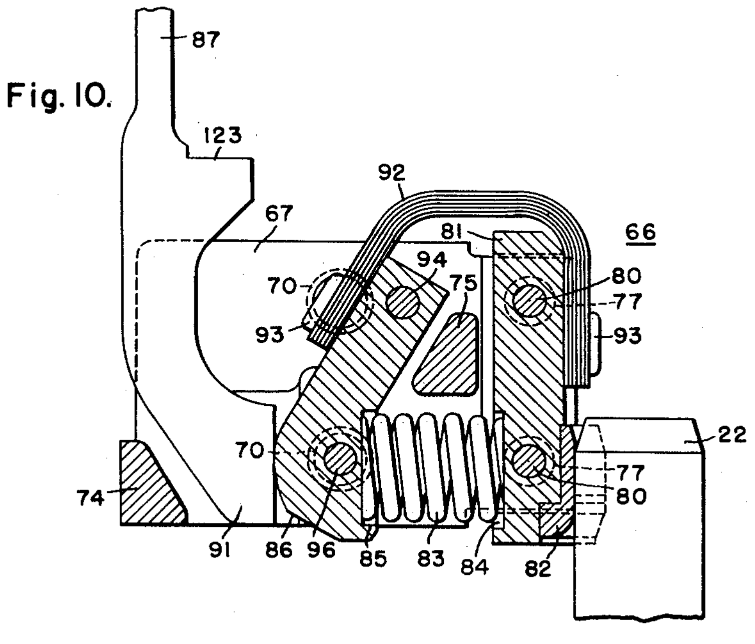
Fig. 10 is an enlarged fragmentary vertical sectional view taken through the contact guide support disposed at the upper end of the relatively stationary bridging contact assemblage shown in Figs. 8 and 9, the view being taken substantially along the line X—X of Fig. 11.

To assist in guiding the relatively stationary contact assemblage 40 interiorly within the casing 20, and to insure its proper position therewithin, we provide a contact guide support, generally designated by the reference numeral 66, and illustrated more clearly in Figs. 10 and 11 of the drawings. The contact guide support 66 is of generally box-shaped construction, having a pair of side walls 67 bevelled at 69, through each of which is provided a pair of tapped apertures 70, which accommodate mounting bolts 71, more clearly shown in Figs. 8 and 9 of the drawings. The side walls 67 have tapped apertures 72 provided therein to accommodate bolts 73 (Fig. 4), which extend through the sides of the casing 20 and secure the contact guide support 66 fixedly in position. A cross-piece 74 extends between the side walls 67 and an additional cross-piece 75 extends therebetween. The sides 67 of the guide support 66 have guide lug portions 76 through which pass relatively large clearance holes 77 (Fig. 11). A pair of pins 80 pass through a contact finger 81, the lower end of which 82 makes contacting engagement with the upper tip of the top movable contact 22 of the assemblage 21. The pins 80 are loosely received in the enlarged holes 77 of the guide lug portions 76 of support 66 to permit a certain amount of lateral inward movement to provide resilient engagement with the contact 22 (Fig. 10), this lateral movement being resiliently supplied by a single compression spring 83, which has one seat in the contact finger 81, as at 84. The other end of the spring 83 seats in a recess 85 provided in a second finger contact 86, which bears against a horn-like contact extension 87, which is bolted to the top casting 16 by bolts 90, as more clearly shown in Fig. 4 of the drawings.

It will be observed from Fig. 11 that the lower end 91 of the contact extension 87 passes between the bevelled side walls 67 of the box-shaped contact guide support 66 with relatively slight clearance, to make contacting engagement wtih the finger contact 86, as shown more clearly in Fig. 10. Thus the contact extension 87 assists in guiding the support 66 to the correct position. Also the edge 68 of the support casting 66 is rounded to register with the interior wall of the casing 20 to further assist in guiding the assemblage 40 into position.

The two contact fingers 81, 86 are electrically interconnected by a flexible strap connection 92 of laminated construction. The flexible strap comprises a plurality of very thin copper strap pieces, which are riveted by rivets 93 to the finger contacts 81 and 86.

As shown in Fig. 10, the resulting construction is of inverted U-shape or of partial loop shape, so that during the interruption of high-amperage currents, the magnetic effect of the current flowing in opposite directions through the contact fingers 81 and 86 will be such as to assist the compression spring 83 in providing a higher contact pressure upon the contact extension 91 and the movable contact 22, respectively. In other words, the current passing in a U-shaped loop tends to expand the loop. So here, by providing the contact fingers 81, 86 in the configuration illustrated in Fig. 10, the higher the ampereage of the current passing through the partial loop afforded by the contact fingers 81, 86, the more the fingers 81, 86 will press outwardly against the contact extension 87 and the movable contact 22.

It will be noted that the contact finger 86 is pivoted upon a pin 94, which passes with slight clearance through holes 95 provided in the side walls 67 of the casting 66. A pin 96, passing through the lower end of the contact finger 86 also passes through the center portion of the enlarged mounting holes 70, so that lateral movement of the lower end of the contact finger 86 is permissible.

Referring more particularly to Fig. 4 of the drawings, it will be observed that the saddle assembly 26 at the upper end of the movable contact assemblage 21 engages a circular plate 97, which forms a lower seat for an accelerating spring assembly 100, disposed at the upper end of the interrupting assembly 6. The accelerating spring 100 biases the spring plate 97 downwardly, and hence the movable contact assemblage 21. The downward movement of the movable contact assemblage 21 effects separation between the tips of the movable contacts 22 and the lower ends 53 of the bridging contact members 45 to establish arcs therebetween.

As observed in Figs. 2 and 4, interrupting units 101 are provided to effect extinction of each of the arcs drawn. The interrupting units 101 are of laminated construction comprising a plurality of suitably shaped plates, which are described and claimed in the aforesaid Friedrich application. Generally, the construction is such that liquid, in this instance oil, can pass from the interior 102 of the casing 20 into the arcing passages 103 to engage the established arcs. Then the liquid may pass out of the interrupting units 101 by means of a plurality of vent passages 104, as indicated in Fig. 4 of the drawings. Reference may be had to the aforesaid Friedrich application for a complete description of the plate configuration and for description of the method of arc extinction herein employed.

Also disposed at the upper end of the interrupting assemblage 6 is the piston 17 movable within a downwardly extending cylindrical guide portion 105 (Figs. 2 and 4) and serving to provide liquid under pressure within the casing 20. The region 106 in back of the piston 17 is vented to the outside of the casing 20 through an opening 107, so that during the interruption of high powers, the piston 17 may be stalled and will not move downwardly until the pressure subsides within the casing 20, at which time a flushing flow of liquid will take place along the arc passages 103 and out of the casing 20 through the vents 104 provided by the interrupting units 101. The piston 17 is biased downwardly by a battery of compression springs 110 which seat at their upper ends against a plate 111, which is secured by screws 112 (Fig. 4) to the upper end of the top casting 16. It will be noted that a circular spring plate 113 is engaged by the lower ends of the springs 110 and this has an extension 114, which passes through an opening 115 provided at the lower end of the piston 17 and is directly engaged by the spring plate 97.

From the foregoing, it will be observed that in the closed-circuit position of the interrupter, the current passing therethrough includes the terminal stud 14, contact foot 12, upper casting 16, contact extension 87, finger contact 86, flexible strap 92, finger contact 81, upper movable contact 22 (Fig. 10), finger contact portions 47 of upper intermediate bridging contact assemblage 41, through the intermediate contacts 45, and through the lower ends 53 thereof to the second movable contact 22. The circuit proceeds downwardly through the interrupting assemblage 6 in a similar manner to the lower contact extension 31, which is directly mechanically and electrically engaged by the cross-bar 10. The circuit then extends through the right-hand interrupting assemblage 7 in a similar manner to the right-hand terminal stud 116 (Fig. 1).

The opening operation of the interrupting assembly 6 will now be described. If there should occur overload currents in the circuit protected by the interrupter, suitable relaying equipment will function to effect opening of the circuit breaker operating mechanism, not shown. Also, should one manually desire to open the interrupter, he would actuate certain control switches which would effect, through the operating mechanism, the same state of affairs as would arise during an overload condition, namely a release of the latching mechanism thereby permitting the opening spring for the interrupter, not shown, to effect a stimultaneous opening of the three operating rods 11, which would be associated with the three poles controlling, say a multi-phase circuit. This would effect downward opening motion of the insulating operating rod 11 in each pole unit, and, consequently, a downward opening motion of the cross-bar 10.

The downward opening movement of the cross-bar 10 permits the downward opening movement of the ladder-like movable contact assembly 21 to occur, as effected by the downward biasing action exerted both by the accelerating spring assembly 100 and also the effect of the battery of compression springs 110 acting through the extension 114 of the circular spring plate 113, as observed more clearly in Fig. 2 of the drawings.

The downward motion of the movable contact assembly 21 effects withdrawal of the tips of the movable contacts 22 from the lower ends 53 of the intermediate bridging contact assemblages 41. This will cause the establishment of a plurality of serially related arcs, one arc established between the upper tip of each movable contact 22 and the lower end 53 of each intermediate bridging contact assemblage 41.

With reference to Figs. 2 and 3 of the drawings, it will be observed that the plurality of serially related arcs will be drawn interiorly within the arcing passages 103 of the interrupting units 101. Arc extinction will take place in the manner described in the aforesaid Friedrich application. During the existence of high-amperage overload currents the internal pressure within the casing 20 within the region 102 may be sufficient to stall the downward movement of the piston 17. In this event the adjacently disposed oil within the arcing passage 103 of each interrupting unit 101 will enable a self-generating deionizing effect to take place, and the oil will be gasified and will be exhausted out of the casing 20 through the plurality of exhaust or vent passages 104 associated with each interrupting unit 101.

It will be noted that throughout the opening stroke of the movable contact assemblage 21 that the upper ends of the bridging contact assemblages 41, more particularly the segmental finger portions 47, will bear upon the sides of the movable contacts 22, as will be obvious from an inspection of Fig. 4 of the drawings. Arc extinction will soon take place within the interrupting units 101, and the circuit will consequently be interrupted before the cross-bar 10 moves away from the lower end 117 of the extension 31 of the lowermost movable contact rod 22.

The downward movement of the ladder-like movable contact assemblage 21 will be brought to a cushioned halt by the functioning of a dashpot, which comprises an upstanding stationary piston portion 120 (Fig. 3) which enters within an annular recess 121 disposed in the lowermost bridging casting 23 of the assemblage 21. It will be obvious that the oil which completely fills the interior 102 of the casing 20 will be forced out of the recess 121 to thereby provide a cushioned halt for the downward travel of the movable contact assemblage 21.

At the same time that the oil dashpot 122 becomes effective the spring plate 97 will engage inwardly extending shoulders 123 provided on the contact extensions 87, and more clearly shown in Figs. 4 and 10 of the drawings. The cross-bar 10 will separate from the lower end 117 of the contact extension 31 to introduce a pair of isolating gaps in clear oil for the interrupter.

As mentioned, during the occurrence of high overload currents the pressure within the region 102 may be sufficient to stall the action of the piston means 124. However, following the interruption of the several arcs, and upon a subsidence of the pressure within the region 102, the springs 110 will become effective to move the piston 17 downwardly thereby forcing oil and providing a flushing flow of liquid out through the exhaust passages 104 associated with the several interrupting units 101. It will be noted that the spring plate 97 will be forced downwardly by the accelerating spring 100 whether or not the piston 17 moves downwardly under the influence of the battery of compression springs 110.

During the interruption of relatively low currents, say of the order of magnitude of charging currents, magnetizing currents or relatively low load currents, the pressure created within the region 102 by the several arcs may not be sufficient to establish a high enough pressure to stall the piston means 124, and in this event the piston 17 will move downwardly with the spring plate 97 and the movable contact assemblage 21. This will cause a piston-actuated flow of liquid to occur within the region 102 to cause thereby a flow of liquid into the interrupting units 104, through the enlarged openings 125 provided by the top and bottom plates of each interrupting unit 104. Thus, arc extinction during the interruption of low currents will be facilitated by the piston-actuated flow of liquid.

A check valve 126 is provided at the upper end of the interrupting assemblage 6, as shown more clearly in Figs. 2 and 4 of the drawings. Briefly, the check valve 126 includes an apertured plate 127 secured by bolts 130 to the upper casting 16 of the assemblage. A valve plate 131 is biased away from an opening 132 provided in the plate 127 by a plurality of compression springs, not shown, encircling a plurality of guide bolts 133, more clearly shown in Fig. 2 of the drawings. Thus, normally in the fully open position of the interrupter, or in the fully closed position of the interrupter, the check valve 126 remains open. Another check valve, not shown, is provided through the bottom casting plate 65, and this too is biased to the open position. Consequently, circulation of oil is encouraged to take place upwardly interiorly within the casing 20, the oil passing through the lower check valve, not shown, provided in the lower closure casting plate 65 and upwardly out of the top check valve 126. These check valves close immediately upon the occurrence of any rise of pressure within the casing 20, and, consequently, are fully closed during the interrupting operation. They are merely provided to encourage the circulation of clean oil upwardly through the casing 20.

Associated with each of the interrupting assemblages 6, 7 are a pair of electrically parallel resistor tubes 134, as shown in Figs. 18 and 19 of the drawings. These resistor tubes 134 enclose a plurality of carbon-impregnated blocks, and, as well known by those skilled in the art, regulate or control the division of voltage between the assemblages 6, 7 during the opening operation. The small residual current, which passes through the resistor tubes 134 following extinction of the arcs within the interrupting units 101, is of unity power factor and is easily interrupted upon the separation of the contact button 32 of the cross-bar 10 separating away from the lower tip 117 of the extension 31 of the movable contact assemblage 21.

It will be apparent that upon loosening the bolts 135, which secure the lower closure plate 65 to a flange ring 136, that the lower end of the casing 20 may be opened. This will permit the movable contact assemblage 21 to be removed out of the casing 20 through the lower end thereof following retraction of the intermediate contacts 45 in a manner more fully described hereinafter. Following the removal of the contact assemblage 21 the ladder-like relatively stationary intermediate contact assemblages 40 may be removed out of the casing 20 by loosening and removing the upper mounting bolts 73 for the contact guide support 66. As a result, the two ladder-like relatively stationary contact assemblages 40 may be moved completely out of the casing 20, without effecting the alignment of the casing 20 or the upper piston structure 124. This, of course, occurs because of the removable connection between the lower end 91 of the contact extension 87 and the contact finger 86 of the contact guide support 66. Following removal of the ladder-like movable contact assemblage 21 and the two relatively stationary intermediate contact assemblages 40 one might inspect the condition of the contact structure to determine whether maintenance or replacement of any of the parts is desirable.

To reassemble the interrupting assemblage 6 one merely needs to replace the ladder-like relatively stationary contact assemblages 40 into position, secure the mounting bolts 73 into place and effect a retraction of the intermediate fingers 41 by mounting bolts which are screwed into the several tapped openings 63 of the intermediate contact fingers 45, and as described in the aforesaid Friedrich application. This will effect a lateral retraction of the several intermediate bridging contacts 45 to permit thereby a ready insertion of the movable contact assemblage 21 into place. Following this operation the lower closure plate 65 may be secured to the ring-shaped flange 136 by the mounting bolts 135.

From the foregoing description of our invention it will be apparent that we have provided an improved relatively stationary contact assemblage which may be readily guided into the proper place by the provision of the contact guide support 66. This will effect a simple engagement between the tip 91 of the contact extension 87 with the contact finger 86. It will furthermore be observed that by the disclosed partial looped construction of the contact fingers 81, 86, as shown in Fig. 10, contact pressure is increased during the passage therethrough of high-amperage overload currents. As shown, only a single contact compression spring 83 need be provided to bias the contact fingers 81, 86 outwardly against the contact extension tip 91 and against the upper movable contact 22.

Moreover, it will be noted that by slotting the upper end of the intermediate bridging assemblages 41 a plurality of resilient finger portions 47 are provided, each of which has its own contact biasing spring 50, and adequate contact pressure is achieved between the finger portions 47 and the sides of the movable contact rods 22. It has been discovered that prior to the slotting, contact spitting took place between the sides of the movable contacts 22 and the upper end of the intermediate contact assemblages 45 when it was of a single piece construction. By slotting the upper end of it, as in Fig. 13, such spitting was avoided and adequate contact pressure was achieved. Moreover, by having a solid lower end 53 of the intermediate contact assemblage 41 equal current distribution takes place through the lower end of the intermediate contact assemblage 41, so that should one of the finger portions 47 maintain contact against the side of the movable contact rod 22, there will be adequate current flow within such finger portion 47 because of the solid construction of the lower end 53 of the intermediate bridging contact finger 45.

It will, of course, be apparent that should the entire intermediate contact finger 45 be slotted throughout its length, or in other words should the slots 46 be extended throughout the entire length of the intermediate bridging contact finger 45, it would be necessary to provide flexible shunts electrically interconnecting such separate independent finger portions so that if the lower end of one finger was pressed against the contact 22 and the upper end of another such finger bore against the upper contact 22, obviously a flexible shunt would be required to interconnect the two fingers. By slotting only the upper end of the intermediate contact finger 45, the current flow through the lower end thereof may be adequately carried to one or more, or all, of the upper finger portions 47, depending upon which one or more bore against the upper contact 22.

Thus, the foregoing description shows how we have greatly improved the contact structure for a circuit interrupter, and the invention has peculiar advantages as applied to a circuit interrupter for very high voltage, such as 330 kv. with the interrupting unit being capable of passing a load current of 2000 amperes continuously. The device is easily dismantled and may be readily inspected.

Although we have shown and described a specific structure, it is clearly to be understood that the same was merely for the purpose of illustration, and that changes and modifications may readily be made therein by those skilled in the art without departing from the spirit and scope of the invention.

We claim as our invention:

1. A circuit interrupter including a relatively stationary contact assemblage, said relatively stationary contact assemblage including a plurality of spaced bridging contacts and being movable as a unitary structure, a movable contact assemblage separate from the aforesaid relatively stationary contact assemblage and including a plurality of spaced movable contacts, means mechanically interconnecting the movable contacts to cause their simultaneous motion, a contact guide support disposed adjacent one end of the relatively stationary contact assemblage, contact means associated with the contact guide support, a relatively stationary contact extension, and the contact extension making contacting engagement with the contact means associated with the guide support in the operative condition of the interrupter.

2. The combination in a circuit interrupter of an elongated casing, a stationary contact extension extending interiorly within the casing adjacent one end thereof, a relatively stationary contact assemblage removable from the casing and adapted to be inserted within the casing at the other end thereof, said contact assemblage including a plurality of spaced contacts and being movable as a unitary structure, a contact guide support disposed adjacent one end of the contact assemblage and making operative engagement with the contact extension when the contact assemblage is moved to its completely operative position.

3. A circuit interrupter including an elongated casing, a movable contact assemblage including a plurality of movable spaced contacts, means mechanically interconnecting the movable contacts to move simultaneously, a plurality of spaced intermediate relatively stationary bridging contacts, a framework normally stationary in the operative condition of the interrupter supporting the intermediate bridging contacts and adapted to be removed from the casing, a contact extension extending along the casing interiorly thereof adjacent one end thereof, a contact guide support disposed adjacent one end of the framework, and said end of the framework being adapted to be inserted into the other end of the casing to make operative connection between the contact extension and the contact guide support.

4. A circuit interrupter including a relatively stationary contact assemblage, said relatively stationary contact assemblage including a plurality of spaced bridging contacts, a movable contact assemblage including a plurality of spaced movable contacts, means mechanically interconnecting the movable contacts to cause their simultaneous motion, a contact guide support disposed adjacent one end of the relatively stationary contact assemblage, a pair of finger contacts supported by the contact guide support, a relatively stationary contact extension, one of the finger contacts making contacting engagement with the contact extension in the operative position of the relatively stationary contact assemblage, and the other finger contact making contacting engagement with at least one of the movable contacts.

5. A circuit interrupter including a relatively stationary contact assemblage, said relatively stationary contact assemblage including a plurality of spaced bridging contacts, a movable contact assemblage including a plurality of spaced movable contacts, means mechanically interconnecting the movable contacts to cause their simultaneous motion, a contact guide support disposed adjacent one end of the relatively stationary contact assemblage, a pair of finger contacts making at least a partial loop supported by the contact guide support, a relatively stationary contact extension, one of the finger contacts making contacting engagement with the contact extension in the operative position of the relatively stationary contact assemblage, and the other finger contact making contacting engagement with at least one of the movable contacts.

6. The combination in a liquid-break circuit interrupter of an elongated casing, a ladder-like relatively stationary contact assemblage including a plurality of intermediate bridging contacts supported in spaced relation by a pair of insulating support bars, a contact guide support disposed adjacent one end of the relatively stationary contact assemblage, a contact extension extending interiorly of the casing adjacent one end thereof, a movable contact assemblage including a plurality of spaced movable contacts, means removably securing the ladder-like relatively stationary contact assemblage to the inner wall of the casing, and the ladder-like relatively stationary contact assemblage being inserted into the other end of the elongated casing to cause operative engagement between the contact guide support and the contact extension.

7. The combination in a liquid-break circuit interrupter of an elongated casing, a ladder-like relatively stationary contact assemblage including a plurality of intermediate bridging contacts supported in spaced relation by a pair of insulating support bars, a contact guide support disposed adjacent one end of the relatively stationary contact assemblage, a pair of serially related contact fingers associated with the contact guide support, a contact extension extending interiorly of the casing adjacent one end thereof, a movable contact assemblage including a plurality of spaced movable contacts, means removably securing the ladder-like relatively stationary contact assemblage to the inner wall of the casing, and the ladder-like relatively stationary contact assemblage being inserted into the other end of the elongated casing to cause engagement between one of the contact fingers and the contact extension and the other contact finger and one of the movable contacts.

8. A circuit interrupter including a relatively stationary contact extension, a movable contact, means for moving the movable contact to the open circuit position, a pair of serially related contact fingers forming a partial loop, one of the contact fingers making removable connection with the contact extension but maintaining contacting engagement therewith during the operative condition of the interrupter, and the other contact finger making separable contacting engagement with the movable contact.

9. A circuit interrupter including a contact extension, a movable contact assembly including a plurality of rod-shaped contacts, means for spacing the rod-shaped contacts and for moving them simultaneously, a relatively stationary bridging contact assemblage including one or more bridging contacts, the bridging contact bearing on one rod-shaped contact and establishing arcing with the immediately adjacent rod-shaped contact, a contact guide support disposed at one end of the bridging contact assemblage and having a pair of serially related finger contacts associated therewith, one of the finger contacts making removable contacting engagement with the contact extension, and the other finger contact making contacting engagement with one of the rod-shaped contacts.

10. A circuit interrupter including a contact extension, a movable contact assembly including a plurality of rod-shaped contacts, means for spacing the rod-shaped contacts and for moving them simultaneously, a relatively stationary bridging contact assemblage including one or more bridging contacts, the bridging contact bearing on one rod-shaped contact and establishing arcing with the immediately adjacent rod-shaped contact, a contact guide support disposed at one end of the bridging contact assemblage and having a pair of serially related finger contacts associated therewith, one of the finger contacts making removable contacting engagement with the contact extension, the other finger contact making contacting engagement with one of the rod-shaped contacts, and the two serially related finger contacts forming a partial loop to increase the contact pressure during the passage of high currents.

11. A circuit interrupter including a contact extension, a movable contact assembly including a plurality of rod-shaped contacts, means for spacing the rod-shaped contacts and for moving them simultaneously, a relatively stationary bridging contact assemblage including one or more bridging contacts, the bridging contact bearing on one rod-shaped contact and establishing arcing with the immediately adjacent rod-shaped contact, a contact guide support disposed at one end of the bridging contact assemblage and having a pair of serially related finger contacts associated therewith, one of the finger contacts making removable contacting engagement with the contact extension, the other finger contact making contacting engagement with one of the rod-shaped contacts, the two serially related finger contacts forming a partial loop to increase the contact pressure during the passage of high currents, and a single biasing means disposed between the finger contacts to bias them into contacting engagement.

12. A circuit interrupter including a pair of serially related contacts, at least one of which is rod-shaped, means mechanically interconnecting the pair of contacts to cause their simultaneous motion, a bridging contact, means splitting the bridging contact only at one end thereof with the other end being solid, the split end of the bridging contact bearing along the side of the rod-shaped contact, and the solid end of the bridging contact making contacting engagement with the other serially related contact.

13. A circuit interrupter including a pair of serially related contacts, at least one of which is rod-shaped, means mechanically interconnecting the pair of contacts to cause their simultaneous motion, a bridging contact, means splitting the bridging contact only at one end thereof with the other end being solid, the split end of the bridging contact bearing along the side of the rod-shaped contact, the solid end of the bridging contact making contacting engagement with the other serially related contact, an adjacently disposed support providing a plurality of spring seats, and a spring for each of the split portions of the bridging contact seated in the spring seats.

14. A circuit interrupter including a pair of serially related contacts, at least one of which is rod-shaped, means mechanically interconnecting the pair of contacts to cause their simultaneous motion, a bridging contact, means splitting the bridging contact only at one end thereof with the other end being solid, the split end of the bridging contact bearing along the side of the rod-shaped contact, the solid end of the bridging contact making contacting engagement with the other serially related contact, an adjacently disposed support providing a plurality of spring seats, a spring for each of the split portions of the bridging contact seated in the spring seats, and means limiting the inward contacting motion of the bridging contact away from the support.

References Cited in the file of this patent

UNITED STATES PATENTS

| | | |
|---|---|---|
| 1,804,628 | MacNeill | May 12, 1931 |
| 1,860,337 | Prince et al. | May 24, 1932 |
| 2,477,781 | Baker et al. | Aug. 2, 1949 |